May 4, 1954     M. TELKES     2,677,664
COMPOSITION OF MATTER FOR THE STORAGE OF HEAT
Filed Feb. 19, 1951

INVENTOR.
MARIA TELKES
BY Kenyon & Kenyon
ATTORNEYS

Patented May 4, 1954

2,677,664

UNITED STATES PATENT OFFICE 2,677,664

COMPOSITION OF MATTER FOR THE STORAGE OF HEAT

Maria Telkes, Cambridge, Mass.

Application February 19, 1951, Serial No. 211,593

8 Claims. (Cl. 252—70)

This invention relates to a composition of matter for use in the storage of heat. This application is a continuation-in-part of my co-pending application Serial No. 693,787, filed August 29, 1946, now Patent No. 2,595,905 issued May 6, 1952.

The invention is not concerned with, or limited to, the storage of heat which has been transmitted from any particular source. Among the applications which have thus far occurred to me are storage of solar heat, storage of waste heat extracted during refrigeration, and the like. For convenience the following description deals with the storage of solar heat.

In the utilization of solar heat for heating purposes, heat collector means and heat storage means are necessary. The heat collector means comprises a radiant energy heat transfer device having at least one radiant energy transferring face adapted to absorb incident solar energy in the form of heat. The heat storage means includes a chemical heat storer. The heat storage means is adapted to receive heat from the collector or to deliver it thereto and is arranged in heat transfer relationship with a space the temperature of which is to be controlled.

The use of waste heat extracted during refrigeration for special purposes, such as defrosting, involves storage of heat for considerable periods of time. Effective storage requires that the heat storer chemical shall crystallize freely when heat is given off and that little or no free water shall remain when the entire composition has solidified, because of the danger of rupture or bursting of pipes and containers. Where, as in the present invention, sodium sulfate serves as the heat storer chemical, it is necessary when giving off heat to prevent or suppress the formation of hydrates (such as the hepta-hydrate, $Na_2SO_4.7H_2O$) which have a different solubility from that of the deca-hydrate. One reason is that formation of hepta-hydrate crystals leaves an excess of water, which on freezing expands far more than deca-hydrate crystals.

This invention is based upon the discovery that borax, when added in amounts between about 1% and 5% to a solution of from about 34% to 44% of sodium sulfate (anhydrous basis) in water, with or without the addition of a corrosion inhibitor, will have the effect of regulating and controlling the crystallization of sodium sulfate (when giving up heat at its critical temperature around 90° F.) such that the crystals formed are predominantly of the desired deca-hydrate and of preventing or suppressing the formation of the undesired hepta-hydrate crystals.

Most materials, and particularly those herein contemplated, when giving up heat at their critical temperature without any stirring, will undercool below their melting points without crystallization. This can be overcome by stirring or agitation. Since for practical purposes it is desirable to maintain heat storer chemicals in sealed containers to insure long life as well as to avoid evaporation, direct stirring to prevent undercooling is not possible. Mechanical means for external agitation of the sealed containers of the chemical while possible is cumbersome and costly. Another object and feature of my invention is therefore to prevent undercooling in such manner as to avoid the necessity either for mechanical agitation or stirring, and it therefore permits the use of sealed containers at low cost of operation.

Other objects and novel features of the invention will become apparent from the following specification and the accompanying drawings wherein.

Figure 1:
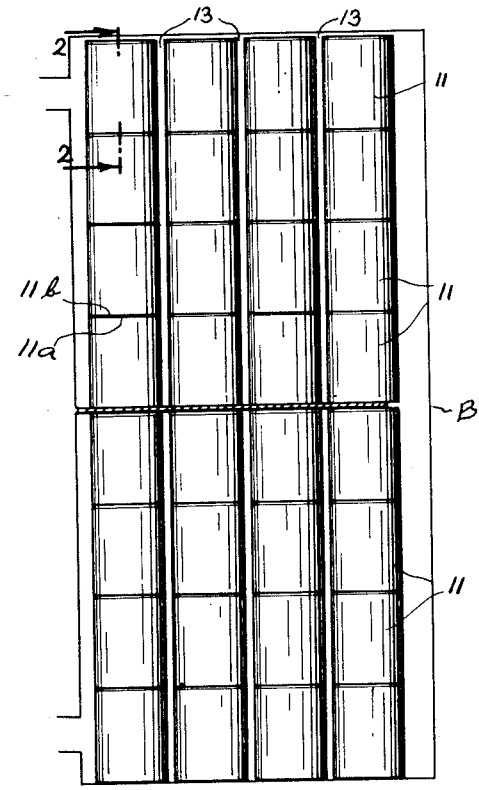
Fig. 1 is a partial elevational of a heat storage bin in which containers of the heat storage medium are arranged.
Figure 2:
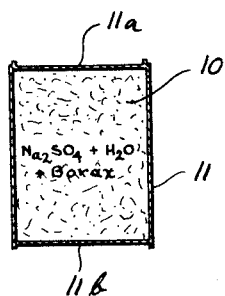
Fig. 2 is a vertical section of one of the containers, taken along line 2—2 of Fig. 1.
Figure 3:
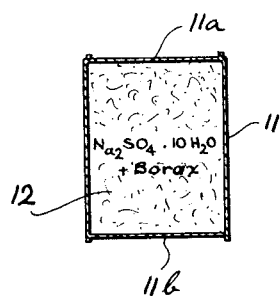
Fig. 3 is a similar section of a modification.

In the aforesaid copending application I have described certain heat storer chemicals as particularly suitable for use in heat storage cells or bins and among such chemicals I have mentioned specifically sodium sulfate decahydrate (Glauber's salt) $Na_2SO_4.10H_2O$ as the chemical filling substance for the hollow interiors of the storage cells or bins because it meets the requirement of having a fusion point at or about the temperature at which it is desired to maintain the wall of the storage cell or bin for use in normal house heating purposes and also has a relatively high latent heat of fusion. Specific constants of said Glauber's salt are: melting point 90° F. and relatively high heat of fusion of 103 B. t. u. per pound.

In actual practice of the invention it is found that the use of this chemical compound involves careful consideration and regard for proper conditions for optimum efficiency which if disregarded result in poor performance. In my copending application hereinbefore referred to the addition of borax (sodium tetraborate decahydrate) $Na_2B_4O_7.10H_2O$ was described as appropriate to prevent "undercooling" of the Glauber's salt and that it acts also as a corrosion inhibitor.

I have now found that the borax is most effective when added in specific amounts to the Glauber's salt as embodied in the following examples.

Sodium sulfate decahydrate, Glauber's salt, $Na_2SO_4.10H_2O$, contains 44% by weight of sodium sulfate, $Na_2SO_4$ and 56% by weight of water $H_2O$. This Glauber's salt can be made readily by mixing anhydrous sodium sulfate $Na_2SO_4$ with water, and as sodium sulfate is available commercially at much lower cost than prepared Glauber's salt, it is preferable from the economic standpoint to utilize the anhydrous sodium sulfate to start.

Furthermore, a solution of anhydrous sodium sulfate $Na_2SO_4$, saturated at the melting point contains 34% by weight of $Na_2SO_4$ and 66% by weight of water. In this, the sodium sulfate is completely dissolved at the melting point, approximately 90° F. Since nearly the same amount of heat can be stored in a cubic foot of the saturated solution (34% $Na_2SO_4$) as can be stored in a cubic foot of Glauber's salt $Na_2SO_4.10H_2O$ (44% $Na_2SO_4$) the preferred range of the chemical is from approximately 34% by weight of $Na_2SO_4$ to approximately 44% by weight of $Na_2SO_4$, taken on an anhydrous basis.

The crystallization promoter borax (sodium tetraborate decahydrate) $Na_2B_4O_7.10H_2O$ is mixed with the sodium sulfate $Na_2SO_4$ plus water in the proportion of approximately one to five per cent by weight of borax and the balance of the weight is sulfate plus water as described.

The actual preparation of the above composition of matter using anhydrous sodium sulfate is as follows:

Water is heated to about 90° F. and one to five per cent by weight of borax is added thereto as a fine powder.

Optionally, a corrosion inhibitor such as sodium chromate ($Na_2CrO_4$) or sodium dichromate ($Na_2Cr_2O_7$) or other suitable inhibitors in small quantities, for example, up to approximately ½% by weight is also added to the heated water and both the borax and the selected corrosion inhibitor are dissolved in the water by stirring or agitation. Then from approximately 34% by weight to 44% by weight of anhydrous sodium sulfate, $Na_2SO_4$, are added to the solutions while agitation or stirring continues. If only 34% by weight of the sodium sulfate is added, this is dissolved completely, except, of course, for small quantities of insoluble foreign matter which may be present in commercial sodium sulfate. If more than 34% by weight of anhydrous sodium sulfate is added and up to approximately 44% by weight of such material, the excess above 34% by weight remains insoluble and forms a slurry with the water.

The solution 10 containing the sodium sulfate is then filled into containers 11, preferably of steel and the filled containers 11 are thereafter sealed. If slurry of the type described is present it is necessary to maintain agitation or stirring during filling of the containers 11 to assure uniform distribution thereof in the containers 11. Also, during filling, it is necessary to maintain the temperature of the material above 90° F. else it crystallizes in part and clogs or plugs the pipes used for filling the containers. Where containers unaffected by sodium sulfate are used, the corrosion inhibitor may be eliminated.

Examples of my composition of matter follow:

*Example 1*

Approximate weight, pounds
Anhydrous sodium sulfate $Na_2SO_4$_____ 35
Borax $Na_2B_4O_7.10H_2O$_____ 3
Corrosion inhibitor_____ ½
Water _____ 61½

Total _____ 100

*Example 2*

Pounds
Anhydrous sodium sulfate $Na_2SO_4$_____ 40
Borax $Na_2B_4O_7.10H_2O$_____ 5
Water _____ 55

Total _____ 100

If the sodium sulfate decahydrate, $Na_2SO_4.10H_2O$

Glauber's salt, is used directly instead of the anhydrous sodium sulfate, the composition of matter is prepared by heating the Glauber's salt above its melting point of approximately 90° and borax (and one of the corrosion inhibitors mentioned, if desired) is then added to the molten Glauber's salt and mixed together thoroughly. While maintaining agitation and a temperature above 90° F. the mixture 12 is then introduced into the containers 11 which are at once sealed.

Further examples of my composition of matter are as follows:

*Example 3*

Approximate weight, pounds
Glauber's salt, $Na_2SO_4.10H_2O$_____ 96½
Borax, $Na_2B_4O_7.10H_2O$_____ 3
Corrosion inhibitor_____ ½

Total _____ 100

*Example 4*

Approximate weight, pounds
Glauber's salt, $Na_2SO_4.10H_2O$_____ 95
Borax, $Na_2B_4O_7.10H_2O$_____ 5

Total _____ 100

In the foregoing Examples 1 to 4 inclusive the sodium sulfate (taken on an anhydrous basis) is a percentage of the sum of sulfate and water approximately as follows: in Example 1, 36.3%; in Example 2, 42.2%; in Examples 3 and 4, 44%. In each case the water of crystallization in the borax is not counted, since the amounts are small.

In actual use of the compositions of matter consisting of the aforementioned mixtures of any of the examples I have found it most advantageous to fill and seal a plurality of individual containers 11 with such mixtures 10 or 12 and then to provide a plurality of tiers of such sealed containers in a bin B with direct heat transfer contact between the tops 11a of containers 11 of any tier and the bottoms 11b of containers in the tier at the next upper level. Small spaces 13 are provided for circulation of air or other heat transfer fluid between containers in each tier. It is advisable to provide large enough dimensions to the containers 11 to allow for effective heat transfer thereto from the circulating air or other fluid about the containers.

The compositions of matter I have described herein act to store heat and are stabilized as to the conditions under which heat transfer action occurs.

While I have described specific embodiments of the invention, variations in detail thereof are possible and are contemplated. There is no intention, therefore, of limitation to the exact details described.

What is claimed is:

1. A composition of matter consisting by weight of approximately 1% to 5% borax, and the balance essentially all Glauber's salt.

2. A composition of matter as described in claim 1 containing approximately ½% of a corrosion inhibitor selected from the group consisting of sodium chromate and sodium dichromate.

3. A heat storage composition consisting by weight substantially of $Na_2SO_4$, water, the $Na_2SO_4$ taken on an anhydrous basis being by weight between approximately 34% and 44% of the sum of the $Na_2SO_4$ and water, and borax by weight equal to approximately 1% to 5% of the composition.

4. A heat storage composition consisting by weight substantially of $Na_2SO_4$, water, the $Na_2SO_4$ taken on an anhydrous basis being by weight between approximately 34% and 44% of the sum of the $Na_2SO_4$ and water, borax by weight equal to approximately 1% to 5% of the composition, and approximately ½% of a corrosion inhibitor selected from the group consisting of sodium chromate and sodium dichromate.

5. A heat storage composition comprising by weight approximately 35% of anhydrous sodium sulfate, approximately 3% borax, approximately ½% corrosion inhibitor selected from the group consisting of sodium chromate and sodium dichromate, and approximately 61½% water.

6. A heat storage composition comprising by weight approximately 40% of anhydrous sodium sulfate, approximately 5% borax and approximately 55% water.

7. A heat storage composition comprising by weight approximately 96½% Glauber's salt, approximately 3% borax, and approximately ½% corrosion inhibitor selected from the group consisting of sodium chromate and sodium dichromate.

8. A heat storage composition comprising by weight approximately 95% Glauber's salt and approximately 5% borax.

References Cited in the file of this patent

UNITED STATES PATENTS

| Number | Name | Date |
|---|---|---|
| 1,887,618 | Bell | Nov. 15, 1932 |

FOREIGN PATENTS

| Number | Country | Date |
|---|---|---|
| 468,756 | Germany | Mar. 17, 1928 |